(12) United States Patent
Murakawa et al.

(10) Patent No.: US 7,580,904 B2
(45) Date of Patent: Aug. 25, 2009

(54) PARAMETER ADJUSTER

(75) Inventors: Masahiro Murakawa, Tokyo (JP);
Keiichi Ito, Tokyo (JP); Tetsunori Wada, Tsukuba (JP)

(73) Assignee: Evolvable Systems Research Institute Inc., Tokyo (JP)

( * ) Notice: Subject to any disclaimer, the term of this patent is extended or adjusted under 35 U.S.C. 154(b) by 617 days.

(21) Appl. No.: 10/541,306

(22) PCT Filed: Jul. 15, 2004

(86) PCT No.: PCT/JP2004/010093

§ 371 (c)(1),
(2), (4) Date: Jul. 5, 2005

(87) PCT Pub. No.: WO2005/008580

PCT Pub. Date: Jan. 27, 2005

(65) Prior Publication Data

US 2006/0158287 A1 Jul. 20, 2006

(30) Foreign Application Priority Data

Jul. 16, 2003 (JP) .............................. 2003-275037

(51) Int. Cl.
*G06N 3/00* (2006.01)
*G06N 3/12* (2006.01)

(52) U.S. Cl. .............................. 706/13; 700/265; 703/8

(58) Field of Classification Search ........................ None
See application file for complete search history.

(56) References Cited

U.S. PATENT DOCUMENTS 5,995,737 A * 11/1999 Bonissone et al. ............. 703/8
6,099,582 A *  8/2000 Haruki ........................ 716/11
6,144,951 A * 11/2000 Dittmar et al. ................ 706/13

FOREIGN PATENT DOCUMENTS

JP          10-154003     6/1998
JP         H10-154003     6/1998

(Continued)

OTHER PUBLICATIONS

XP007907512; "Application of the Genetic Algorithm to Compact MOSFET Model Development and Parameter Extraction" X. Cai, H Wang, X. Gu, G.Gildenblat and P. Bendix; Department of Electrical Enginieering, The Pennsylvanica State University, University Park PA 16802, USA, xqc100@psu.edu, LSI Logic, 1551 McCarthy Blvd., MS J-100, Milpitas, CA 95035.

(Continued)

*Primary Examiner*—David R Vincent
*Assistant Examiner*—Kalpana Bharadwaj
(74) *Attorney, Agent, or Firm*—Manabu Kanesaka (57) ABSTRACT

A chromosome using each of a plurality of parameters of a physical model of a semiconductor element as a gene is defined and the parameters are optimized using a genetic algorithm based on the characteristics measurement data of the semiconductor element fabricated by way of trial. In the selection processing of the genetic algorithm, a sum of a first evaluation value based on linear scale data and a second evaluation value based on logarithmic scale data is employed as the evaluation value of the chromosome.

5 Claims, 9 Drawing Sheets

FOREIGN PATENT DOCUMENTS

| | | |
|---|---|---|
| JP | 10-334070 | 12/1998 |
| JP | H10-334070 | 12/1998 |
| JP | 2003-85526 | 3/2003 |
| JP | 2003-108972 | 4/2003 |

OTHER PUBLICATIONS

XP007907426; "Extraction of Compact Model Parameters for ULSI MOSFETs Using a Genetic Algorithm" Josef Watts, Calvin Bittner, Douglas Heaberlin, and James Hoffmann; IBM Microelectronics, Essex Junction, VT, USA; University of Vermont, Burlington, VT USA.

XP007907517; Chapter 3, "Genetic Algorithm for Deep-Submicron MOSFET Simulation".

XP007907525; "Simplex Crossover and Linkage Identification: Single-Stage Evolution Vs. Multi-Stage Evolution" Shigeyoshi Tsutsui and David E. Goldberg; Proceedings of the 2002 Congress on Evolutionary Computation (CEC'02), vol. 1, May 12, 2002-May 17, 2002, p. 974-979.

XP007907540; "Real multi-parent tri-hybrid evolutionary optimization method and its application in wind velocity estimation from wind profile data" Noel E. Mendoza[a], Yen-Wei Chen[a,c], Zensho Nakao[a], Tatsuhiro Adachi[b], Yoshihisa Masuda[b]; Applied Soft Computing, vol. 1, No. 3, Dec. 30, 2001, pp. 225-235.

XP007907534; "Dynamic modeling of genetic networks using genetic algorithm and S-system" Shinichi Kikuchi[1,2], Daisuke Tominaga[1], Masanori Arita[1,2], Katsutoshi Takahashi[1] and Masaru Tomita[2]; Bioinformatics, vol. 19, No. 5, Mar. 22, 2003, pp. 643-650.

\* cited by examiner

PARAMETER ADJUSTER

RELATED APPLICATIONS

The present application is based on International Application No. PCT/JP04/10093 filed Jul. 15, 2004, and claims priority from, Japan Application Number 2003-275037 filed Jul. 16, 2003, the disclosure of which are hereby incorporated by reference herein in its entirety.

TECHNICAL FIELD

The present invention relates to a parameter tuning device, and in particular, relates to a parameter tuning device capable of tuning a large number of parameters in a physical model of a semiconductor device such as a transistor in a short time.

When manufacturing an LSI, first, several samples of transistors (MOSFET) having different sizes such as a channel length L and channel width W of gates of the transistor (MOSFET) are manufactured on a processing line. Next, from the results of measurement of electrical characteristics of the test devices, a plurality of parameters in a physical model of the transistors is tuned so as to match to characteristics of transistors manufactured on the processing line with high precision. Also, using the physical model of the transistors, simulations of various kinds of LSIs (transistors) manufactured on the processing line are performed using a well-known circuit simulator such as SPICE.

A physical model of transistors represents relationships such as Vg (gate voltage), Vd (drain voltage), and Id (drain current) with equations including variables such as a gate channel length L, a channel width W, and a plurality of parameters, and a large number of models have been proposed. In the above simulations, for example, a typical and well-known BSIM (Berkeley Short Channel IGFET Model) is used.

The BSIM is formed of a large number of equations, and the number of parameters to be tuned is more than 50. Regarding the physical models of transistors and conventional parameter tuning methods, because they are described for example in the following document, their detailed explanations are referred to herein and omitted.

Non-patent document 1: Toru Toyabe, ed., "MOSFET Modeling and BSIM3 Users Guide", Feb. 28, 2002, published by Maruzen Conventionally, parameter tuning devices which automatically perform parameter fitting (tuning) of physical models including plural parameters using genetic algorithms from experimental results, and the like, have been proposed. For example, in Patent Document 1 filed by the present inventors, a general parameter tuning device which automatically performs parameter tuning process of physical models including plural parameters using genetic algorithms has been proposed.

Patent document 1: Japanese Patent Publication (Kokai) No. 2003-108972

DISCLOSURE OF THE INVENTION

The Subject of the Invention to be Solved

In the above conventional parameter tuning method, because a large number of parameters can not be optimized simultaneously, tuning of all the parameters is performed by iterating an operation of first optimizing only a part of the parameters and then optimizing another part of the parameters with the fixed parameter. In the method, there is a problem of not capable of resolving optimal parameters depending on a processing order of parameters to optimize, or of requiring a large amount of time and labor for resolving.

Therefore, the present inventors performed a study on applying the above general parameter tuning process to parameter tuning of physical models of transistors. But there is a problem that tuning of parameters with efficiency and good precision is difficult even when applying the conventional genetic algorithm as-is to the parameter tuning of physical models of transistors. A purpose of the present invention is to solve the above problems.

Means for Solving the Subject

A parameter tuning device of the present invention is mainly characterized in that it has means for generating new parameter genes by a special crossover process. Also, it has normalization means for applying to real-number parameters. Furthermore, it is characterized also by an evaluation means for performing evaluation of parameters so as to match characteristics particular to transistors (MOSFET) with high precision.

Effect of the Invention

The parameter tuning device of the present invention with characteristics described above has an effect that it becomes possible to apply genetic algorithms to parameter tuning of physical models of transistors, and optimal parameters can be decided in a short time.

BRIEF DESCRIPTION OF THE DRAWINGS

FIGS. 6(*a*) and 6(*b*) are graphs showing Id-Vg characteristics of a transistor;

EXPLANATION OF REFERENCE NUMERALS

G: Center of gravity
P1-P3: Parent individuals

BEST MODE FOR PERFORMING THE INVENTION

A parameter tuning device of the present invention is implemented by creating a program for executing a process indicated by a flow chart to be described, and installing the program on a well-known optional computer system that is capable of executing it. Regarding hardware of the computer system, because it is well known, a detailed explanation is omitted. Embodiment 1 is explained below.

EMBODIMENT 1

Figure 1:
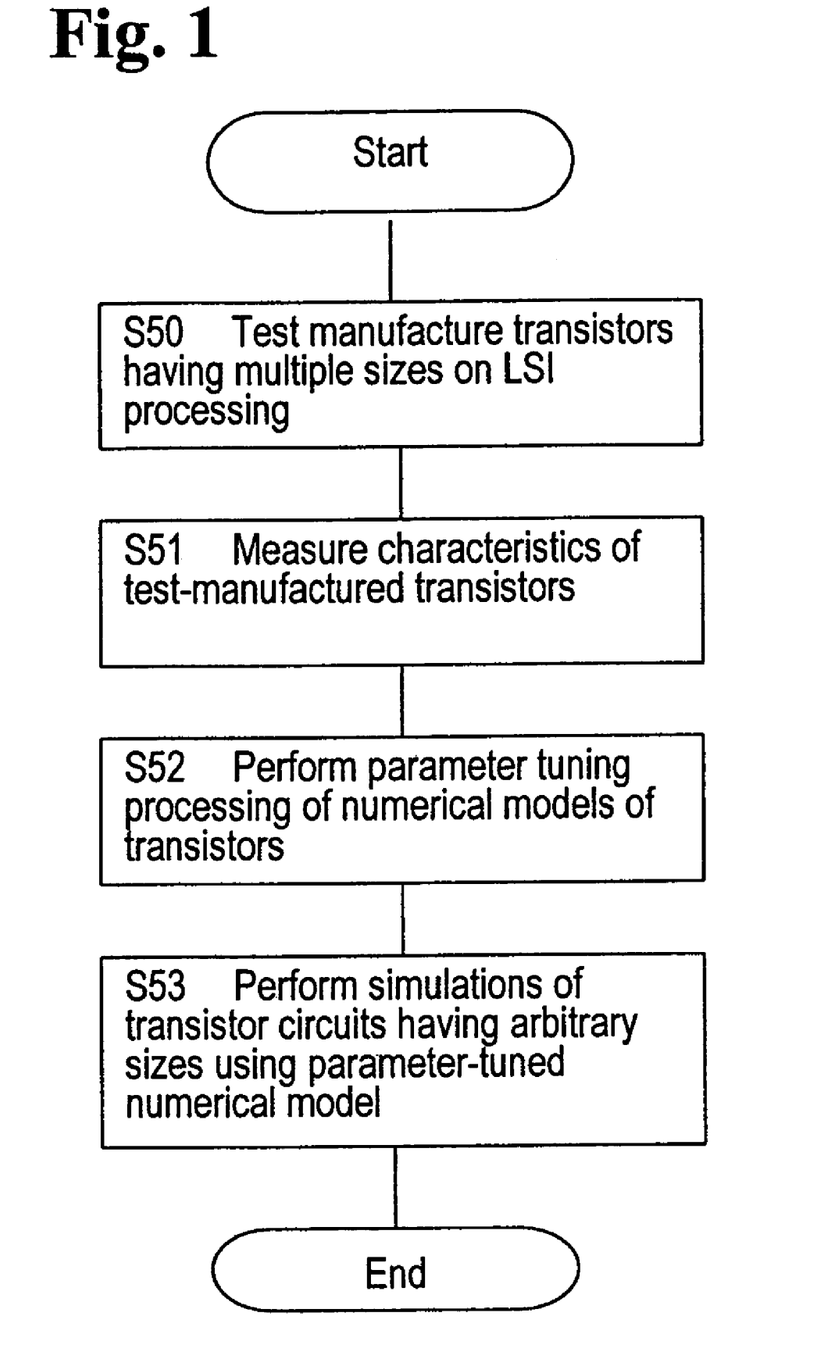
FIG. 1 is a flow chart showing an overall procedure when performing simulation using a parameter tuning device of the present invention.

FIG. 1 is a flow chart showing an overall procedure when performing simulation using a parameter tuning device of the present invention. As previously noted, when manufacturing an LSI, first, in S50, several samples of transistors (MOSFET) having different sizes such as a channel length L and channel width W of gates are test manufactured on an LSI processing line.

Figure 9:
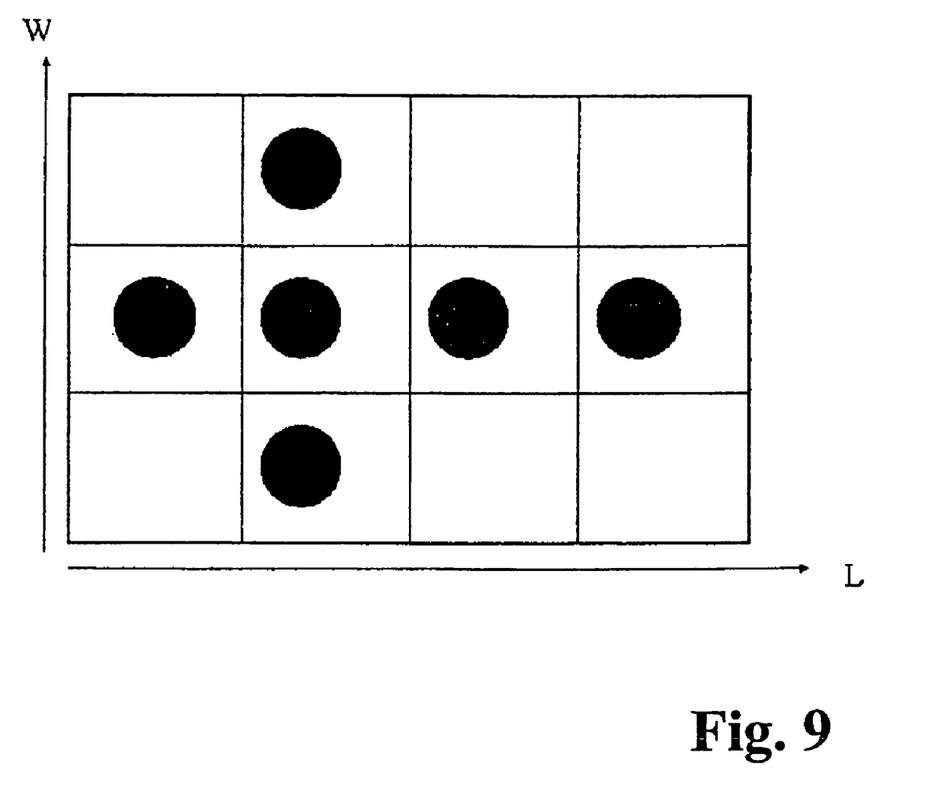
FIG. 9 is an explanatory drawing showing a method of selection of sizes of transistors to be test manufactured.

FIG. 9 is an explanatory drawing showing a method of selection of sizes of transistors to be test manufactured. The size selection method, for example, divides between the maximum values and minimum values of L and W at equal intervals, or making sides near the minimum values more fine, and selects divisions (sizes) of the transistors to be test manufactured so as to become a cross shape on the L-W plane.

In S51, electrical characteristics of the test-manufactured transistors are measured. Concretely, measurements to obtain plural sample values (discrete data) respectively concerning Id-Vd characteristic (Vb fixed), Id-Vd characteristic (Vg fixed), and Id-Vg characteristic (Vd fixed) are performed multiple times while changing the fixed values.

In S52, a parameter tuning process of a physical model of transistors is performed by a method to be described later using the parameter tuning device of the present invention so as to match the characteristics of the transistors manufactured on the processing line with high precision.

In S53, using the physical model with the parameters tuned, operating simulations of transistors having arbitrary channel lengths and channel widths manufactured on the processing line are performed using a well-known circuit simulator such as SPICE.

By using the parameter tuning device of the present invention, high-precision parameters of the physical model can be obtained in a short time, and high-precision simulations can be performed.

Figure 2:
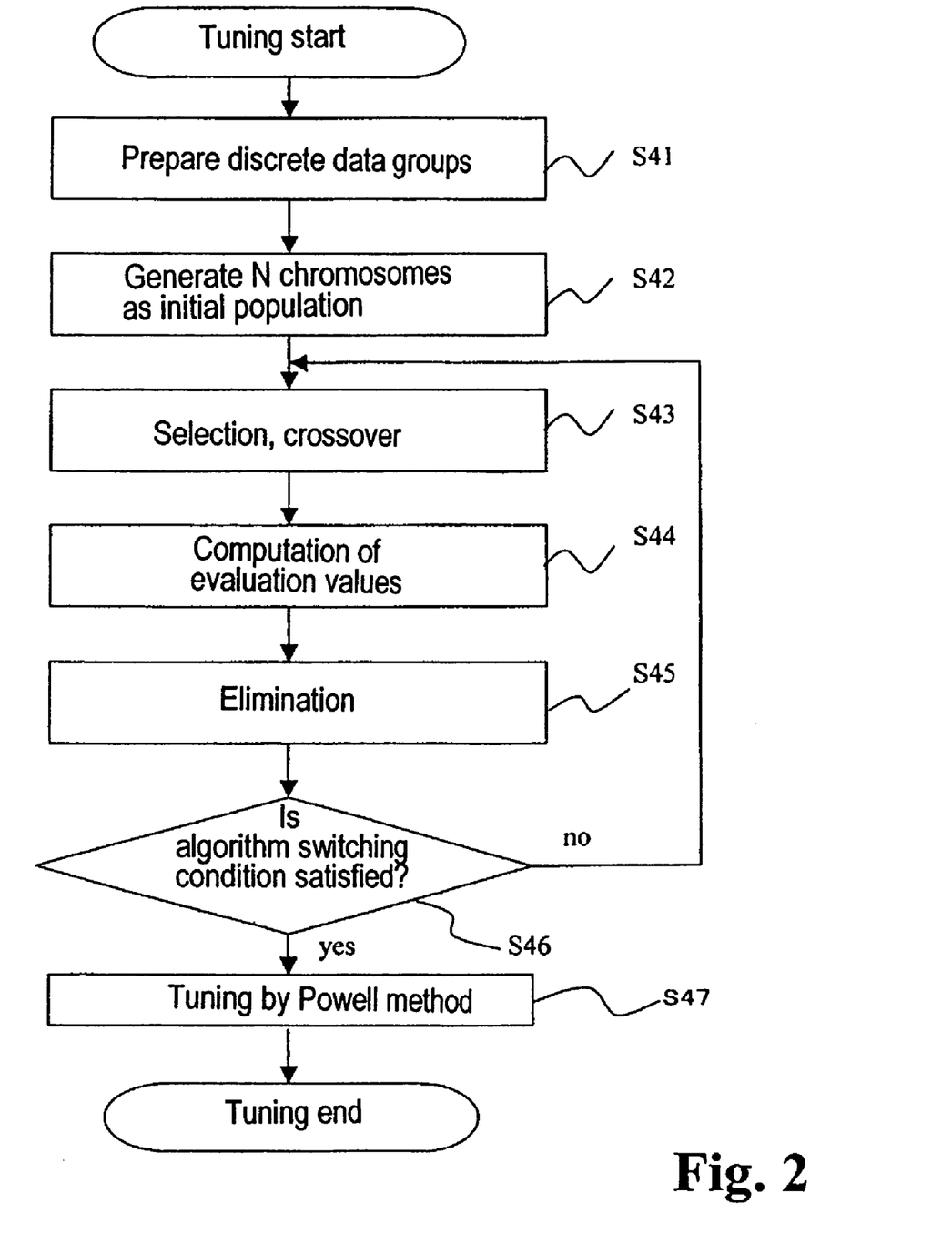
FIG. 2 is a general flow chart showing a parameter tuning process.

FIG. 2 is a general flow chart showing a parameter tuning (fitting) process using a genetic algorithm. In S41, one or more discrete data groups (measurement results) are prepared. In S42, N chromosomes having arbitrary parameters of functions in a physical model of transistors as genes are prepared as an individual population. Individual generation is to decide the values of the genes in the chromosome and to compute an evaluation value of that chromosome. N must be a number greater than or equal to 2.

In the BSIM, although there are 50 or more parameters as previously noted, depending on the details to be simulated, there may be parameters fixed to default values without tuning, or may be ignored. Accordingly, the number n of parameters to be tuned differs according to the purpose of the simulation, and although there may be 50 or more, it also may be for example 10. Therefore, the parameters such as the number of chromosomes N or the number of generated children (Child) in the genetic algorithm are changed depending on the number n of the parameters to be tuned. Accordingly, the process becomes faster as n becomes smaller. In the embodiment, for example, the number of chromosomes is set to N=n×15. In the BSIM, because a recommended range of initial parameter values is established for each parameter, an initial value is decided randomly within the recommended range of initial values for each parameter.

In S43, chromosomes to become parent individuals are selected from the individual population generated in S42. The number p of parent individuals selected in the process must be less than or equal to N. Child individuals are generated by a crossover process to be described later from the selected parent individuals. In S44, the evaluation values of the child individuals generated in S43 are computed (the details are described later).

In S45, the parent individuals selected in S43 and p in the order of better evaluation from the child individuals generated in S44 are returned to the individual population, and the rest are discarded. By this process, the chromosomes having low evaluation values are eliminated. In addition, a method also may be used, in which a portion of the parent individuals is returned as-is to the population without being subject to elimination, and a number in the amount of "remaining parent individuals" and the remaining parent individuals in the order of better evaluation from the child individuals are returned.

In S46, it is determined whether an algorithm switching condition is satisfied. If the condition is not satisfied, it returns to S43, but if the condition is satisfied, it moves to S47. As the condition, whether the number of computations exceeds a prescribed value, or a rate of reduction of evaluation value becomes less a prescribed value can be used. In S47, tuning of the parameters is performed by the well-known Powell method as a local search method or other well-known local search method. By switching the search method in this manner, the time of parameter tuning is shortened.

Next, a crossover process in the present invention is explained. As a conventional crossover method, a process of partially replacing genes of chromosomes has been performed. Although the conventional crossover method is effective when the genes have bit values (0 or 1), it is not necessarily an effective crossover method when the genes are real numbers. The reason why is because a space of genotypes defined in the binary expression has a different phase structure from a space of the actual parameters after conversion to real numbers, and therefore continuity of the parameters is not considered.

For example, in the case that one bit in a binary number is inverted, the parameter after the inversion, depending on a position of the inverted bit, becomes larger when the highest bit is inverted, but the parameter value almost does not change at all when the lowest bit is inverted. Because the parameters subject to tuning in the present invention are real numbers, it is difficult to perform effective tuning with the conventional crossover method. Therefore, the crossover method oriented toward real numbers described below is used rather than the conventional crossover method.

Figure 3:
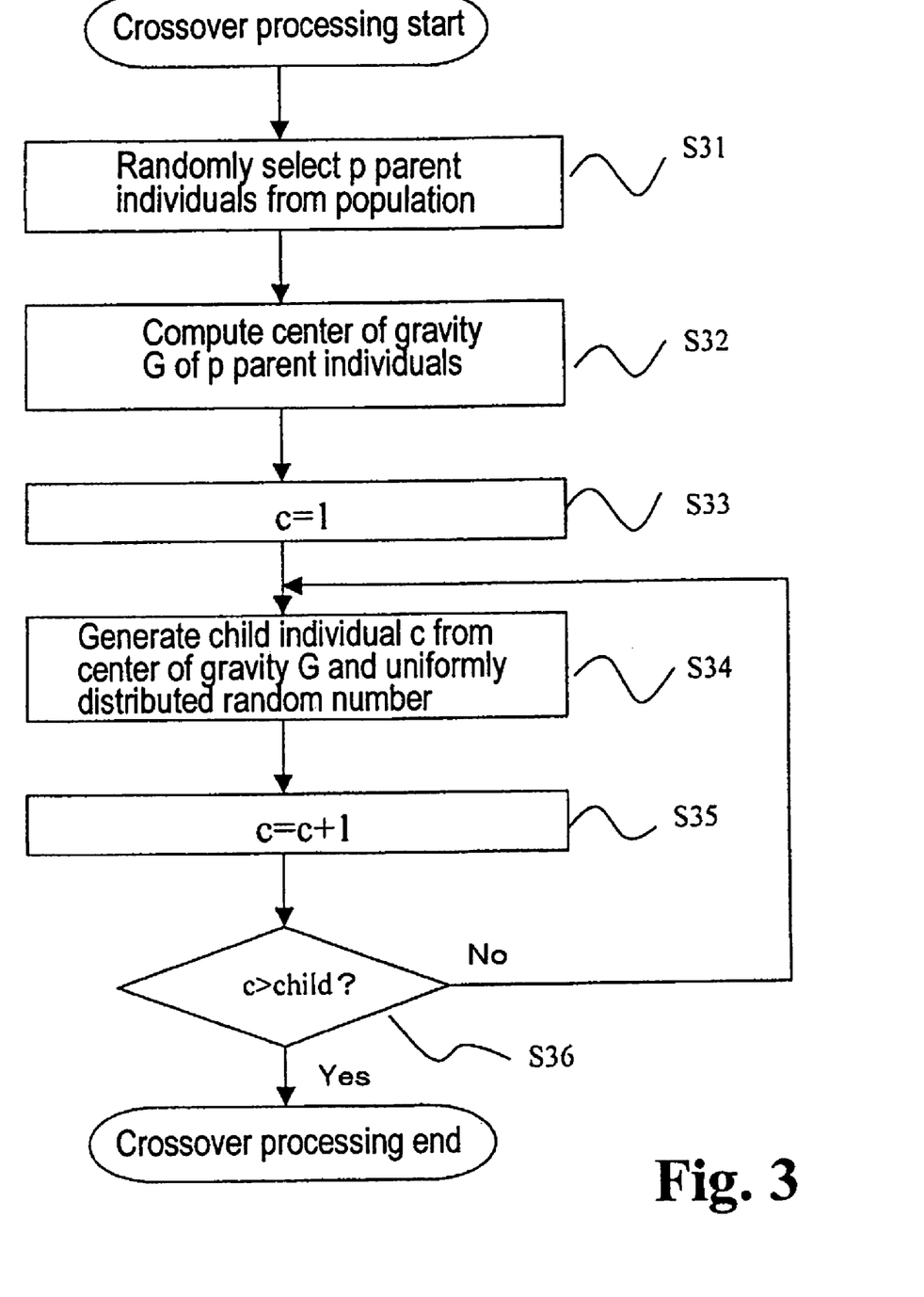
FIG. 3 is a flow chart showing a detail of a crossover process in S43.
Figure 4:
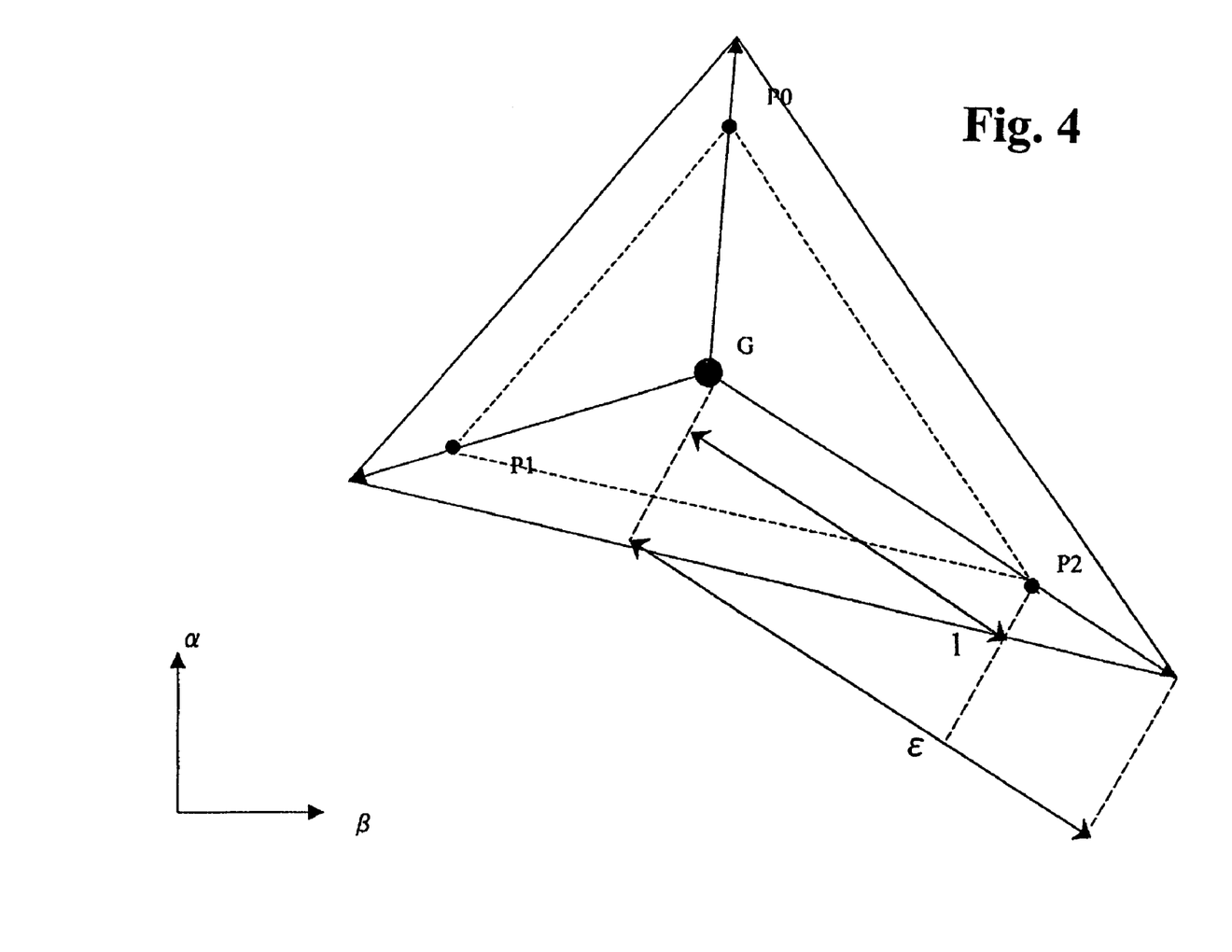
FIG. 4 is an explanatory drawing showing an example of a crossover method of the present invention.

FIG. 3 is a flow chart showing a detail of the crossover process in S43. The crossover method is oriented toward real numbers, which generates genes of child individuals from a simplex computed from genes of plural parent individuals. FIG. 4 is an explanatory drawing showing an example of the crossover method. In S31, p parent individuals are randomly selected from the individual population. The value of p is desirably defined as p=n+1 when there are n parameters to be tuned. In S32, the center of gravity G of the p parent individuals selected in S31 is sought. That is, an average value is sought for each parameter.

In S33, a variable c is set to 1, and in S34, one child individual is generated by Equation 1 below using the center of gravity G and a uniformly distributed random number.

$$C = x_p + C_p$$ [Equation 1]

$$x_k = G + \varepsilon(P_k - G)$$

$$C_k = \begin{Bmatrix} 0 (k = 0) \\ r_{k-1}(x_{k-1} - x_k + C_{k-1})(k = 1 \ldots p) \end{Bmatrix}$$

$$r_k = \left(u(0, 1)^{\frac{1}{k-1}}\right)$$

Here, p is the number of parent individuals selected, C is a vector indicating the chromosome of the child individual generated, and Pk is a vector indicating the chromosome of the selected parent individual. In the present embodiment, the number of parent individuals selected is set to n+1. Also, u(0,1) is a uniformly distributed random number in an interval [0,1].

In S35, 1 is added to the variable c, and in S36, it is determined whether the variable c is greater than the constant "child". If the determination result is negative, it returns to S34, but if it is affirmative, the crossover process ends. By this processing, a "child" number of child individuals are generated. "Child" is desirably about 10×n.

FIG. 4 is an explanatory drawing showing a search range of simplex crossovers (generated range of child individuals) when there are 2 parameters α and β the number of parent individuals randomly selected from the individual population is 3. The generated range of child individuals (inside of outer triangle in FIG. 4) is decided by multiplying by ϵ the vectors of parent individuals up to P1-P3 from the center of gravity G, and a child individual is generated using a uniform random number from that range. The recommended value of ϵ is $\sqrt{(p+1)}$ when the number of parent individuals is p. When the number of parameters is 3 or more, the generated range of child individuals becomes a space inside a hyperpolyhedron surrounded by plural hyperplanes.

By using such a crossover method, in response to problems in which the parameters to be subject to tuning are real numbers, the parameters can be handled positively, and effective tuning can be performed. Being able to handle positively means that an individual in the vicinity of the parameter space is also in the vicinity of the gene space. Such a crossover method has characteristics that it is robust to the dependencies among variables and it does not depend on the method of scaling. It is suitable for tuning of parameters of functions in an electrical characteristics model of transistors in which the dependencies among the parameters are strong and there are a large number of parameters having different scaling.

Usually, in the genetic algorithms, a process called mutation is performed in addition to the crossover. Mutation, in the case of conventional genetic algorithms that handle discrete binary data, performs an operation of inverting a part of genes of a chromosome. Also, in the case of genetic algorithms that handle real numbers, an operation of adding a normal random number generated according to the normal distribution N(0, $\sigma^2$) to each gene of the chromosome has been proposed. However, because the crossover method of the present invention as noted above uses random numbers in the crossover process, it combines also the property of mutation. Therefore, the mutation is not performed in the case of using the crossover method as noted above.

Next, the evaluation value executed in S44 is explained. The evaluation value of a chromosome is computed from prepared discrete data groups and estimation data groups computed as a function in an electrical characteristics model of transistors using genes of the chromosome as model parameters. The evaluation value is a value indicating how close the genes in the chromosome are to ideal values as model parameters.

Figure 5:
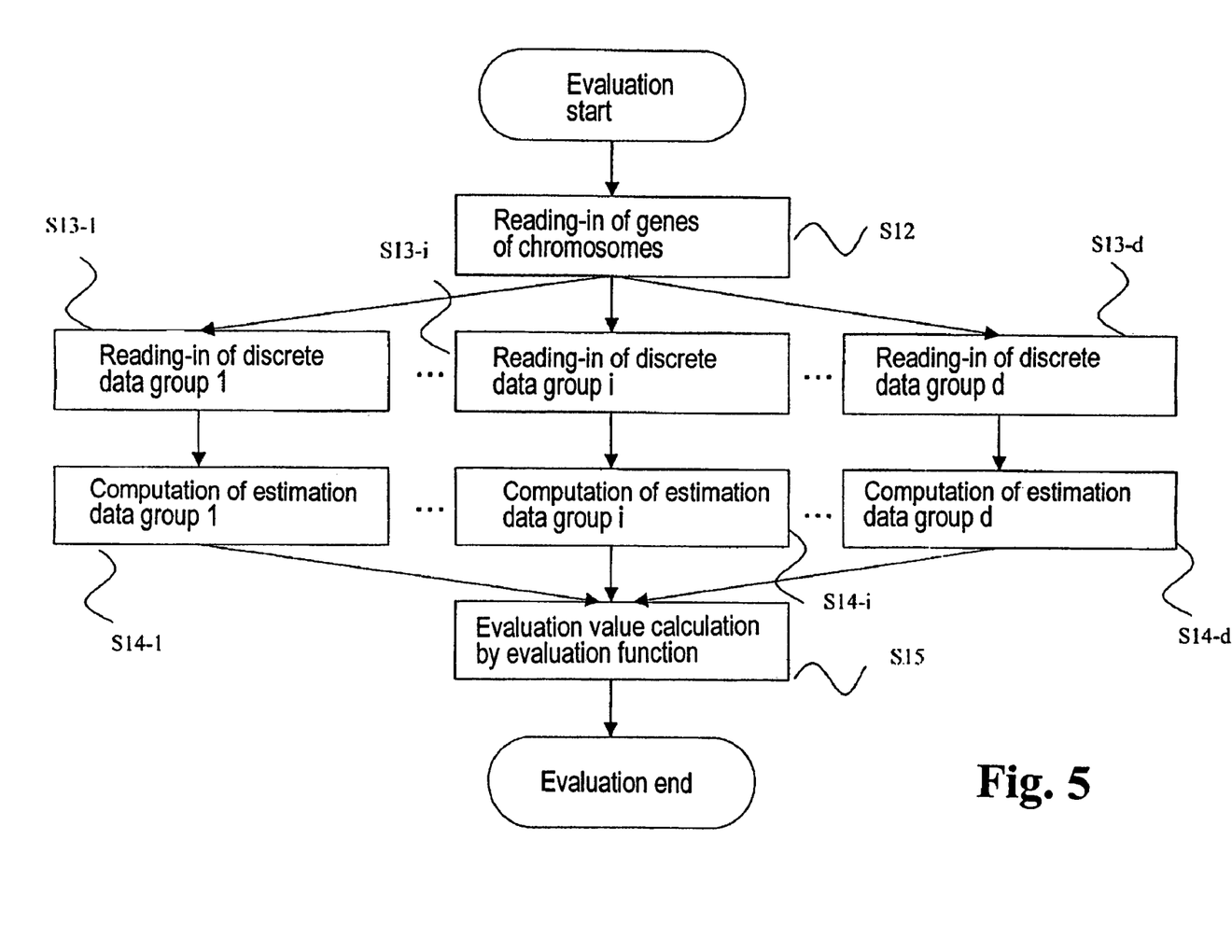
FIG. 5 is a flow chart showing a detail of an evaluation computation process.

FIG. 5 is a flow chart showing a detail of the evaluation computation process. In S12, the gene information of the chromosome is read in, and it is taken as model parameters in functions of the electrical characteristics model of transistors. In S13-1 ... S13-d, the discrete data groups are read in. d is the number of discrete data groups read in.

In S14-1 ... S14-d, estimation data groups for predicting the discrete data groups are computed based on the model parameters input in S12. The estimation data groups are present in the same number as the discrete data groups. In S15, the evaluation value of the chromosome is computed from the discrete data groups and the estimation data groups. As the evaluation function, the square error to be described later, or the like, is used.

Figure 6A:
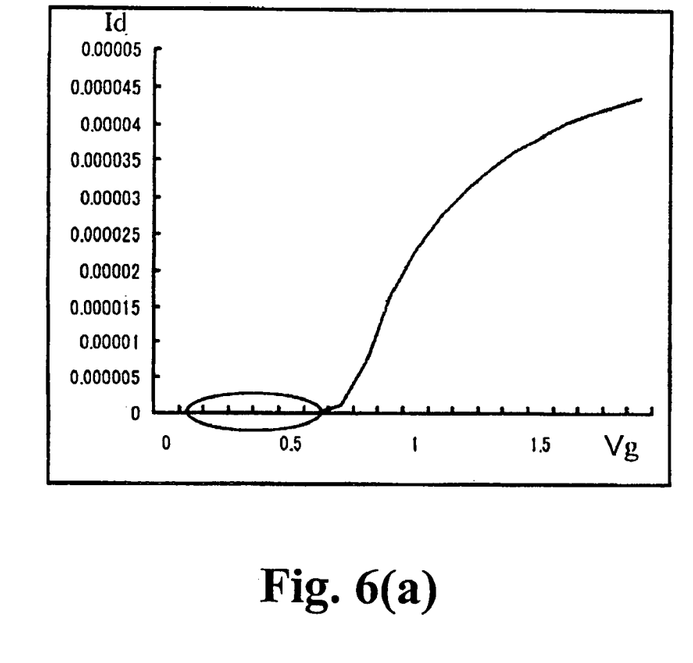
Figure 6B:
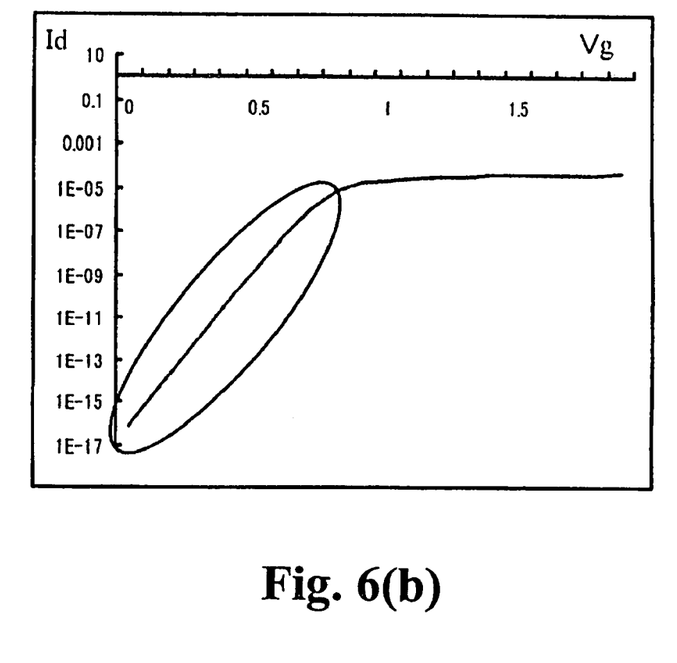

FIG. 6(a) is a graph of linear scale and FIG. 6(b) is a graph of log (logarithmic) scale showing the Id-Vg characteristics of a transistor. As in the parts surrounded by the ellipses in FIG. 6, there is a part in the discrete data group, where it appears as almost 0 when viewed on the linear scale in FIG. 6(a) but the values are greatly changed when viewed on the log scale in FIG. 6(b). Such a property is called sub-threshold characteristic.

Because the absolute value of this part is small compared with the other parts, the absolute value of the error also is small, and it is difficult to optimize this part using only the normal linear scale data group. Also, although the sub-threshold characteristic can be optimized if the optimization is performed by preparing only a log scale data group in order to tune this part, the error of the other parts becomes greater and discrepancy occurs.

Therefore, in the present invention, attention is on the fact that the electrical characteristics model parameters of MOS transistors are independent between the parameters for estimating the sub-threshold characteristic and the parameters for estimating the other parts. By the scaling process shown below, the log scale data group and the linear scale data group are read in simultaneously, and all the characteristics are tuned simultaneously.

In the case when the scaling among discrete data groups is different, if the square error is taken, the data group having small scale comes to have smaller influence on the evaluation value. Therefore, there is a concern that the tuning precision may fall even when the scaling process previously described is performed. Therefore, in the present invention, the tuning precision is improved by normalizing the discrete data in each data group and unifying the scale.

Figure 7:
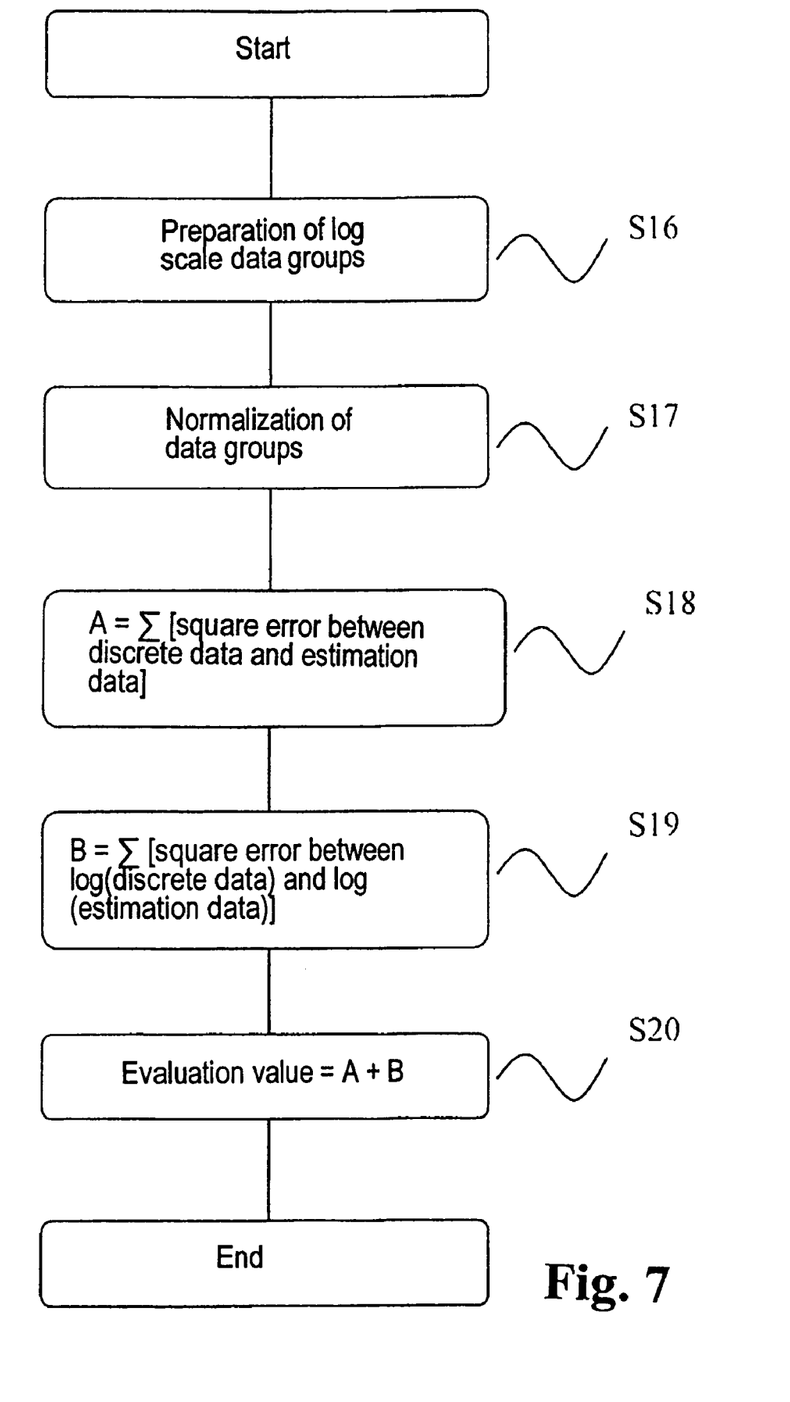
FIG. 7 is a flow chart showing one example of an evaluation value computation in S15.

FIG. 7 is a flow chart showing one example of computation of evaluation value, in which the above scaling and discrete data normalization method are packaged in S15. In S16, logarithmic data converted the discrete data groups and the corresponding estimation data groups to log scale are generated. In S17, all the data groups are normalized.

Figure 8:
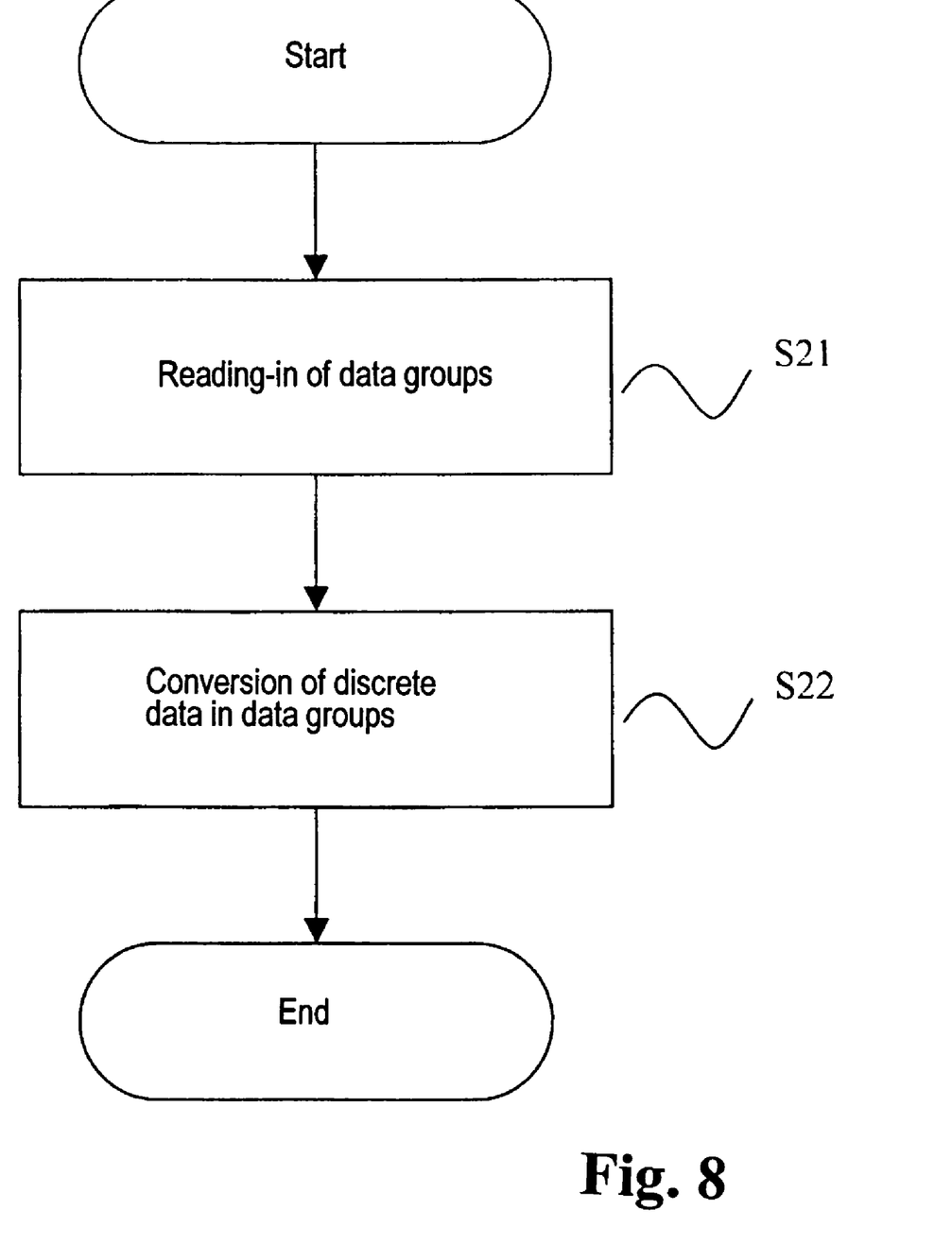
FIG. 8 is a flow chart showing a discrete data normalization process in S17.

FIG. 8 is a flow chart showing one example of the normalization processing of discrete data performed in S17. In S21, the data groups are read in. In S22, conversion of the data indicated below is performed. That is, first, the maximum value fmax and minimum value fmin in the data groups are sought. Next, all the discrete data f(i) in the data groups are converted to normalized data g(i) by Equation 2 below.

$$g(i) = \frac{f(i) - f_{min}}{f_{max} - f_{min}} \quad [\text{Equation 2}]$$

Here, g(i) is normalized data, f(i) is discrete data, fmax is a maximum value in data groups, and fmin is a minimum value in the data groups. By this computation, the discrete data can be normalized to within the range of [0, 1].

Returning to FIG. 7, in S18, the evaluation value of only the linear scale data groups is computed and is taken as A. A is a sum of the square errors between the normalized discrete data and the normalized estimation data. In S19, the evaluation value of only the log scale data groups is computed and is taken as B. B is a sum of the square errors between the normalized logarithmic discrete data and the normalized logarithmic estimation data. In S20, A+B is taken as an evaluation value of the chromosome. Although the square error is used for computation of the evaluation value, it also may be made such that the error ratio is sought instead of the square error.

By the processing as described above, high-precision parameter tuning is possible in a short time. Also, because high-precision circuit simulation can be performed without test manufacturing by using the parameters in question for the physical model, the efficiency of manufacturing of semiconductor devices is improved.

Embodiment 1 is explained above, but in the parameter tuning device of the present invention, modified examples as below also can be imagined. The BSIM is given as an example of the physical model of transistors, but the present invention can use any well-known physical model of transistors in addition to the BSIM. Furthermore, the present invention can be applied to any well-known semiconductor device other than transistors.

POSSIBILITY OF USING ABILITY IN INDUSTRY

The present invention can be utilized in the simulation of various kinds of LSIs manufactured on an LSI processing line using the physical models of transistors.

What is claimed is:

1. A parameter tuning device for tuning a large number of parameters in a physical model of a semi-conductor device, comprising:

parameter tuning means for defining chromosomes having a plurality of respective parameters of the physical model for performing simulation of the semiconductor device as a gene and optimizing the plurality of parameters of said physical model using a genetic algorithm based on characteristic measurement data of a test-manufactured semiconductor device, and said parameter tuning means including a child chromosome generating means, said child chromosome generating means obtaining a center of gravity of a parent chromosome group in a vector space selected in a crossover process in the genetic algorithm;

determining a hyper-polyhedron on a vector space shown by a peak of vectors which extend to each selected parent chromosome from said center of gravity and are respectively multiplied by predetermined times; and generating a child individual using a uniformly distributed random number so as to be housed inside said hyper-polyhedron and be used in a simulation of a LSI manufacture on an LSI processing line using physical models of transistors.

2. A parameter tuning device according to claim 1, wherein said parameter tuning means includes an evaluation value computing means for obtaining a first evaluation value based on a linear scale and a second evaluation value based on a log scale to make a sum of the first evaluation value and the second evaluation value as an evaluation value of the chromosome in a selection process in the genetic algorithm.

3. A parameter tuning device according to claim 1, wherein said parameter tuning means includes normalization for unifying a scale of data in the selection process in the genetic algorithm.

4. A parameter tuning device according to claim 1, wherein said parameter tuning means includes search method switching means for switching to local searching means when a parameter tuning process in the genetic algorithm satisfies a predetermined condition.

5. A parameter tuning device according to claim 1, wherein when p is the number of parent individuals selected, C is a vector indicating the chromosome of the child individual generated, Pk is a vector indicating the chromosome of the selected parent individual, u(0, 1) is a uniformly distributed random number in an interval [0,1], and $\epsilon$ is a constant given by $\sqrt{(p+1)}$, one child individual is generated by Equation 1 below using said center of gravity G and said uniformly distributed random number u;

$$C = x_p + C_p \quad \text{[Equation 1]}$$

$$x_k = G + \varepsilon(P_k - G)$$

$$C_k = \begin{cases} 0 (k = 0) \\ r_{k-1}(x_{k-1} - x_k + C_{k-1})(k = 1\ldots p) \end{cases}$$

$$r_k = \left(u(0, 1)^{\frac{1}{k-1}}\right).$$

* * * * *